No. 865,780. PATENTED SEPT. 10, 1907.
A. L. HOOVER.
VINE SEPARATING MECHANISM FOR POTATO DIGGERS.
APPLICATION FILED JUNE 22, 1907.
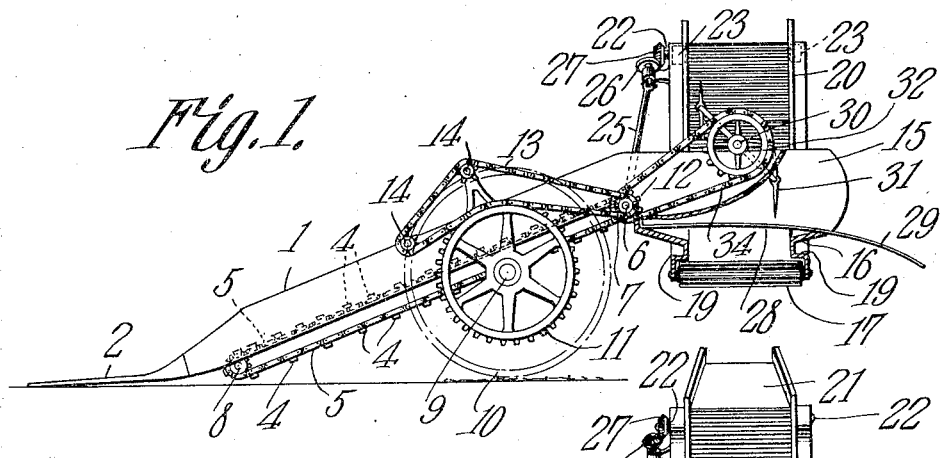
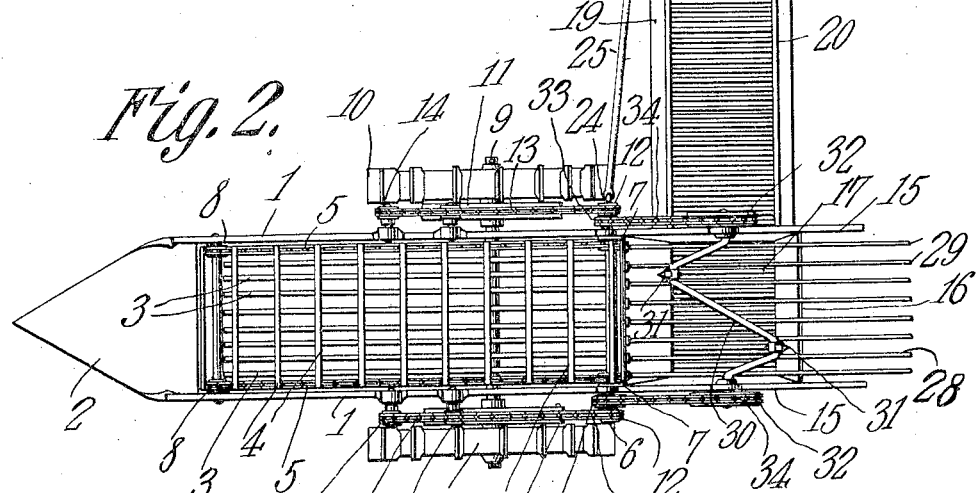
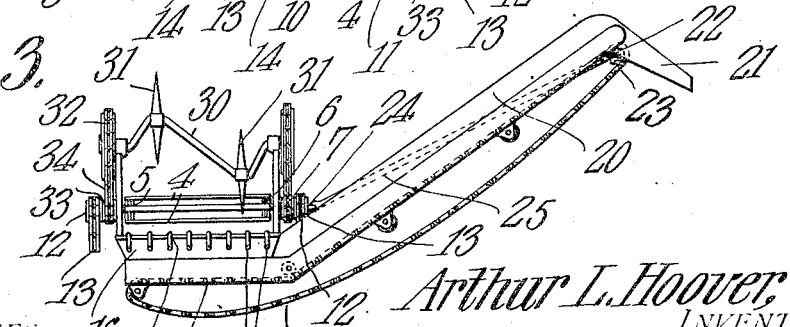
WITNESSES:
Arthur L. Hoover,
INVENTOR.
By C. A. Snow & Co.
ATTORNEYS

UNITED STATES PATENT OFFICE.

ARTHUR LEWIS HOOVER, OF AVERY, OHIO.

VINE-SEPARATING MECHANISM FOR POTATO-DIGGERS.

No. 865,780.

Specification of Letters Patent.

Patented Sept. 10, 1907.

Application filed June 22, 1907. Serial No. 380,309.

*To all whom it may concern:*

Be it known that I, ARTHUR LEWIS HOOVER, a citizen of the United States, residing at Avery, in the county of Erie and State of Ohio, have invented a new and useful Vine-Separating Mechanism for Potato-Diggers, of which the following is a specification.

This invention has relation to vine separating mechanisms for potato diggers and it consists in the novel construction and arrangement of its parts as hereinafter shown and described.

The object of the invention is to provide a separating mechanism of the character indicated which may be applied as an attachment to a potato digger or may be formed as a part of the same when the digger is originally constructed.

The mechanism consists primarily of a hopper adapted to be attached to the rear end of a potato digger and which is provided with a conveyer bottom moving transversely with relation to the digger. A series of spaced rods is located over the hopper and extends rearwardly from the digger. The rear extremities of the said rods are downwardly inclined. A vine lifter and thrower of peculiar construction is located above the said rods and is adapted to engage the potato vines, weeds, etc., and separate the same from the roots.

In the accompanying drawing:—Figure 1 is a side elevation of a potato digger with the separator attached thereto and shown partly in section. Fig. 2 is a top plan view of the digger and separator, and Fig. 3 is a rear elevation of the separator.

The potato digger consists of the side bars 1 having the digging point 2 attached at their forward ends and spaced slats 3 located between them. The cross slats 4 are attached at their ends to the chains 5 and form a conveyer for elevating the potatoes, vines, weeds, etc. from the ground. The shaft 6 is journaled for rotation at the upper portions of the side bars 1 and the sprocket wheels 7 are fixed to the said shaft. The chains 5 pass around the sprocket wheel 7 and similar sprocket wheels 8 journaled for rotation at the lower end portions of the side bars 1. The side bars 1 are mounted upon an axle 9 which in turn is supported by the traction wheels 10. The said axle rotates with the said wheels. The sprocket wheels 11 are fixed to the axle 9 and the sprocket wheels 12 are fixed to the shaft 6 in alinement with the sprocket wheels 11. The chains 13 pass around the sprocket wheels 12 and over the sprocket wheels 14 and engage the sides of the sprocket wheels 11 whereby the sprocket wheels 12 are caused to rotate in the opposite direction from that in which the sprocket wheels 11 rotate.

The rear portions of the side bars 1 extend back substantially horizontally as at 15 and the hopper 16 is supported below the lower edges of the horizontal portions of the said side bars. The hopper 16 is provided with a conveyer bottom 17 which consists of a series of parallel slats supported at their ends by the sprocket chains 18. The sides of the hopper 16 are formed from what is known as Z-iron and consequently they have the intermediate horizontal portions 19 which lie over the chains 18. The sides of the said hopper 16 lie transversely under the side bars 1 and are upwardly inclined as at 20 and are provided with a suitable chute 21 at their upper end. The shaft 22 is journaled for rotation at the upper end portions of the inclined extensions 20 and the chains 18 pass around the sprocket wheels 23 fixed to the said shaft. One end of the shaft 6 is provided with a universal joint 24 to which is attached one end of the shaft 25. The opposite end of the last said shaft is provided with a beveled pinion 26 which meshes with a similar pinion 27 fixed to the shaft 22. The spaced rods 28 are located over the hopper 16 and extend in alinement with the potato digger. The rear end portions of the said rods are downwardly curved as at 29 and extend for some distance behind the hopper 16. The crank shaft 30 is journaled for rotation above the rods 28 and each crank of the said shaft is provided with a pivotally mounted impaling lifter 31. The sprocket wheel 32 is fixed to the crank shaft 30 and a sprocket wheel 33 is fixed to the shaft 6 in alinement with the sprocket wheel 32. The sprocket chain 34 passes around the sprocket wheels 32 and 33.

From the foregoing description it is obvious that as the digger provided with the vine and weed separator as described is drawn along the ground and the potatoes are dug and elevated with the vines, weeds, etc. along the slats 3 that most of the earth will be sifted from the vegetation through the said slats and that the potatoes, together with the vines and weeds, will be deposited upon the rods 28. As the crank shaft 30 is rotating the impaling lifters 31 will engage the vines and weeds and elevate the same and cast them upon the downwardly curved end portions 29 of the said rods 28 while the potatoes will pass through the spaces between the said rods and fall upon the conveyer bottom 17 of the hopper 16. The vines, weeds, etc. fall from the ends of the rods 28 to the ground immediately in the rear of the potato digger while the potatoes are carried by the conveyer bottom 17 up along the inclined extensions 20 of the hopper 16 and are deposited into the chute 21 from whence they may fall into a suitable receptacle such as a wagon body or its equivalent.

Having described my invention what I claim as new and desire to secure by Letters-Patent is:—

1. A separator as described comprising a hopper, a conveyer forming the bottom of the same, spaced rods located above the hopper and a vine lifter located above said rods.

2. In combination with a digger having an elevator, a hopper attached to the digger below the end of the elevator, rods located above the hopper and extending in alinement with the digger, said hopper having a movable conveyer bottom which moves transversely with relation to the digger, a vine lifter located above the rods, means for transmitting movement from the digger elevator to the lifter, and means for transmitting movement from the digger elevator to the hopper bottom.

In testimony that I claim the foregoing as my own, I have hereto affixed my signature in the presence of two witnesses.

ARTHUR ~~LEWIS~~ HOOVER.

Witnesses:
M. E. HAWLEY,
FRED A. ROBERTS.